(12) United States Patent
Tzeng et al.

(10) Patent No.: US 6,924,611 B1
(45) Date of Patent: Aug. 2, 2005

(54) BRUSHLESS MOTOR DRIVE DEVICE

(75) Inventors: Guang-Nan Tzeng, Hsinchu (TW);
Feng-Rurng Juang, Hsinchu (TW);
Chi-Yang Chen, Hsinchu (TW)

(73) Assignee: Aimtron Technology Corp., Hsinchu (TW)

( * ) Notice: Subject to any disclaimer, the term of this patent is extended or adjusted under 35 U.S.C. 154(b) by 0 days.

(21) Appl. No.: 10/711,235

(22) Filed: Sep. 3, 2004

(51) Int. Cl.$^7$ .............................................. H02K 23/00
(52) U.S. Cl. ...................... 318/254; 318/138; 318/439; 318/779; 318/801
(58) Field of Search ................................ 318/801, 779, 318/254, 138, 439, 599, 729, 798, 807, 811

(56) References Cited

U.S. PATENT DOCUMENTS

| 3,585,517 | A | 6/1971 | Herbert |
| 5,811,949 | A | 9/1998 | Garces |
| 6,710,568 | B2 | 3/2004 | Fujii |
| 6,710,572 | B2 | 3/2004 | Okubo |
| 2003/0020431 | A1 * | 1/2003 | Kiuchi et al. ................ 318/779 |
| 2003/0052643 | A1 * | 3/2003 | Sweo .......................... 318/801 |

* cited by examiner

*Primary Examiner*—Karen Masih
(74) *Attorney, Agent, or Firm*—Winston Hsu

(57) ABSTRACT

A Hall sensing circuit generates a positional detection signal representative of a positional relationship between a rotor and a phase coil of a motor. A signal synthesizing circuit transforms the positional detection signal to a driving signal. Based on a comparison of the driving signal and a high-frequency reference signal, a pulse signal is generated for controlling a switching circuit to dive the motor. A current error signal is supplied through feedback to adjust a relative relationship between an amplitude of the drive signal and an amplitude of the high-frequency reference signal, thereby changing a duty ratio of the pulse signal. A duty-ratio limiting circuit is provided to limit the duty ratio of the pulse signal for ensuring a reliable rotation of the motor.

20 Claims, 5 Drawing Sheets

US 6,924,611 B1
BRUSHLESS MOTOR DRIVE DEVICE

BACKGROUND OF THE INVENTION

1. Field of the Invention

The present invention relates to a motor drive device and, more particularly, to a motor drive device for a brushless DC motor.

2. Description of the Related Art

FIG. 1(a) is a circuit block diagram showing a conventional brushless motor drive device. Referring to FIG. 1(a), a motor M is a three-phase DC brushless motor having three phase coils U, V, and W. A Hall sensing circuit 11 is arranged around the motor M for detecting a position of a rotor of the motor M, thereby generating three positional detection signals HU, HV, and HW. In response to the positional detection signals HU, HV, and HW, a signal synthesizing circuit 12 generates three sinusoidal drive signals SU, SV, and SW. Subsequently, the sinusoidal drive signals SU, SV, and SW are input to a pulse width modulation (PWM) comparing circuit 13 for being individually compared with respect to a high-frequency triangular signal T generated by an oscillating circuit 14. Based on the comparison of the sinusoidal drive signals SU, SV, and SW individually with the high-frequency triangular signal T, the PWM comparing circuit 13 generates three pulse signals PU, PV, and PW to be supplied to three pre-drivers N1, N2, and N3. In response to the pulse signal PU, the pre-driver N1 generates a pair of switching signals UH and UL. In response to the pulse signal PV, the pre-driver N2 generates a pair of switching signals VH and VL. In response to the pulse signal PW, the pre-driver N3 generates a pair of switching signals WH and WL.

A three-phase switching circuit 15 has a pair of switches S1 and S2, a pair of switches S3 and S4, and a pair of switches S5 and S6, each pair being controlled by one corresponding pair of the switching signals UH and UL, VH and VL, and WH and WL. A motor drive current Im is allowed to flow from a drive voltage source Vdd to the coil U when the switch S1 becomes short-circuited and to flow from the coil V to a ground potential when the switch S2 becomes short-circuited. The motor drive current Im is allowed to flow from the drive voltage source Vdd to the coil V when the switch S3 becomes short-circuited and to flow from the coil V to the ground potential when the switch S4 becomes short-circuited. The motor drive current Im is allowed to flow from the drive voltage source Vdd to the coil W when the switch S5 becomes short-circuited and to flow from the coil W to the ground potential when the switch S6 becomes short-circuited.

For detecting the motor drive current Im, a resistor Rs is series-connected between the common connecting point of the switches S2, S4, and S6 and the ground potential. A voltage difference caused by the motor drive current Im flowing through the resistor Rs is supplied as a negative feedback to an inverting input terminal of an error amplifier EA. The error amplifier EA compares the voltage difference representative of the motor drive current Im with a current command signal Icom for generating a current error signal Ierr. Subsequently, the signal synthesizing circuit 12 adjusts the amplitudes of the sinusoidal drive signals SU, SV, and SW in accordance with the current error signal Ierr.

FIG. 1(b) is a waveform timing chart showing operations of the conventional brushless motor drive device. For the sake of simplicity, only is illustrated in FIG. 1(b) the operational waveforms associated with the coil U of the motor M since each of the phase coils U, V, and W of the motor M is operated with similar waveforms. Referring to FIG. 1(b), the pulse signal PU is generated from the comparison of the sinusoidal drive signal SU and the high-frequency triangular signal T through using the PWM comparing circuit 13. More specifically, the HIGH level of the pulse signal PU corresponds to an interval of time when the sinusoidal drive signal SU goes higher than the high-frequency triangular signal T and the LOW level of the pulse signal PU corresponds to an interval of time when the sinusoidal drive signal SU goes lower than the high-frequency triangular signal T. In response to the pulse signal PU, the pre-driver N1 generates the switching signals UH and UL for controlling the switches S1 and S2, respectively.

In order to regulate the motor drive current Im to follow the current command signal Icom, the error amplifier EA supplies the current error signal Ierr to the signal synthesizing circuit 12 for adjusting the amplitude of the sinusoidal drive signal SU. For example, when the motor drive current Im is smaller than the current command signal Icom, the current error signal Ierr controls the signal synthesizing circuit 12 to increase the amplitude of the sinusoidal drive signal SU so as to obtain a sinusoidal drive signal SU'. As clearly seen from FIG. 1(b), the sinusoidal drive signal SU' with a larger amplitude causes the PWM comparing circuit 13 to generate a pulse signal PU' with a larger duty ratio. In response to the pulse signal PU' with the larger duty ratio, the three-phase switching circuit 15 causes an increase of the motor drive current Im and therefore the motor drive current Im approaches to the current command signal Icom.

However, When the difference between the motor drive current Im and the current command signal Icom becomes too large, for example, at the activation of the motor M the motor drive current Im starts from zero, the signal synthesizing circuit 12 may even generate a sinusoidal drive signal SU" with an amplitude larger than that of the high-frequency triangular T in response to an extremely great current error signal Ierr. As a result, the PWM comparing circuit 13 generates a pulse signal PU" with a frequency lower than that of the high-frequency triangular signal T. The low-frequency pulse signal PU" induces a large ripple to the motor torque and deteriorates the smooth rotation of the motor M. Moreover, the low-frequency pulse signal PU" remains at the HIGH/LOW level each cycle for a relatively long time such that the three-phase switching circuit 15 supplies the motor drive current Im in the continuous mode other than the PWM mode. The long-time continuous supply of the motor drive current Im may damage the motor M and the three-phase switching circuit 15. Also, the temperature rising caused by the large heat dissipation may trigger the thermal shutdown mechanism.

SUMMARY OF THE INVENTION

In view of the above-mentioned problems, an object of the present invention is to provide a brushless motor drive device capable of limiting the duty ratio of the pulse signal.

Another object of the present invention is to provide a brushless motor drive device capable of preventing the frequency of the pulse signal from becoming lower.

Still another object of the present invention is to provide a brushless motor drive device capable of preventing the pulse signal from remaining at the HIGH/LOW level for a relatively long time.

According to one aspect of the present invention, a brushless motor drive device is provided with a limiting circuit for limiting a duty ratio of a pulse signal. A Hall sensing circuit generates a positional detection signal representative of a positional relationship between a rotor and a coil of a motor. A signal synthesizing circuit transforms the positional detection signal into a drive signal. Based on a comparison of the drive signal and a high-frequency reference signal, a pulse signal is generated for controlling a switching circuit to drive the motor. A current error signal is supplied through feedback to adjust a relative relationship between an amplitude of the drive signal and an amplitude of the high-frequency reference signal, thereby adjusting the duty ratio of the pulse signal.

With the limiting circuit, the pulse signal is provided with a high frequency and an appropriate duty ratio even when the amplitude of the drive signal becomes larger than the amplitude of the high-frequency reference signal due to a great current error signal. Therefore, the limiting circuit ensures a reliable rotation of the motor and effectively prevents from the disadvantages caused by the prior art.

Preferably, the limiting circuit may include a first comparator and a second comparator. The first comparator generates a positive-half duty-ratio limit signal based on a comparison between the high-frequency reference signal and a predetermined positive-half limit level. A HIGH time of the pulse signal each cycle is constrained within a HIGH time of the positive-half duty-ratio limit signal each cycle. The second comparator generates a negative-half duty-ratio limit signal based on a comparison between the high-frequency reference signal and a predetermined negative-half limit level. A LOW time of the pulse signal each cycle is constrained within a LOW time of the negative-half duty-ratio limit signal each cycle.

Preferably, the predetermined positive-half limit level may be set slightly smaller than the maximum value of the high-frequency reference signal. Preferably, the predetermined negative-half limit level may be set slightly larger than the minimum value of the high-frequency reference signal.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

The preferred embodiments according to the present invention will be described in detail with reference to the drawings.

Figure 1A:
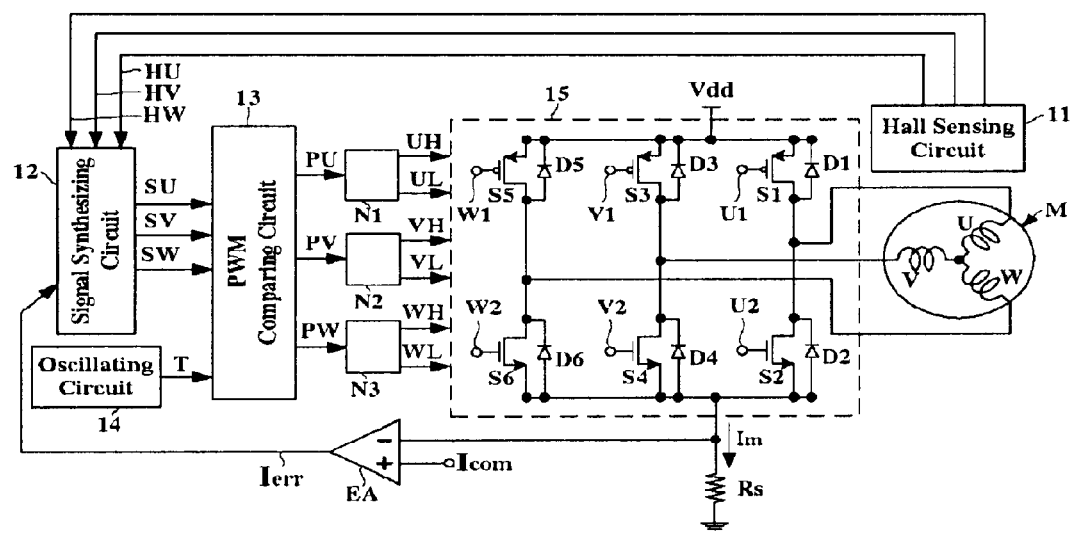
FIG. 1(a) is a circuit block diagram showing a conventional brushless motor drive device.
Figure 1B:
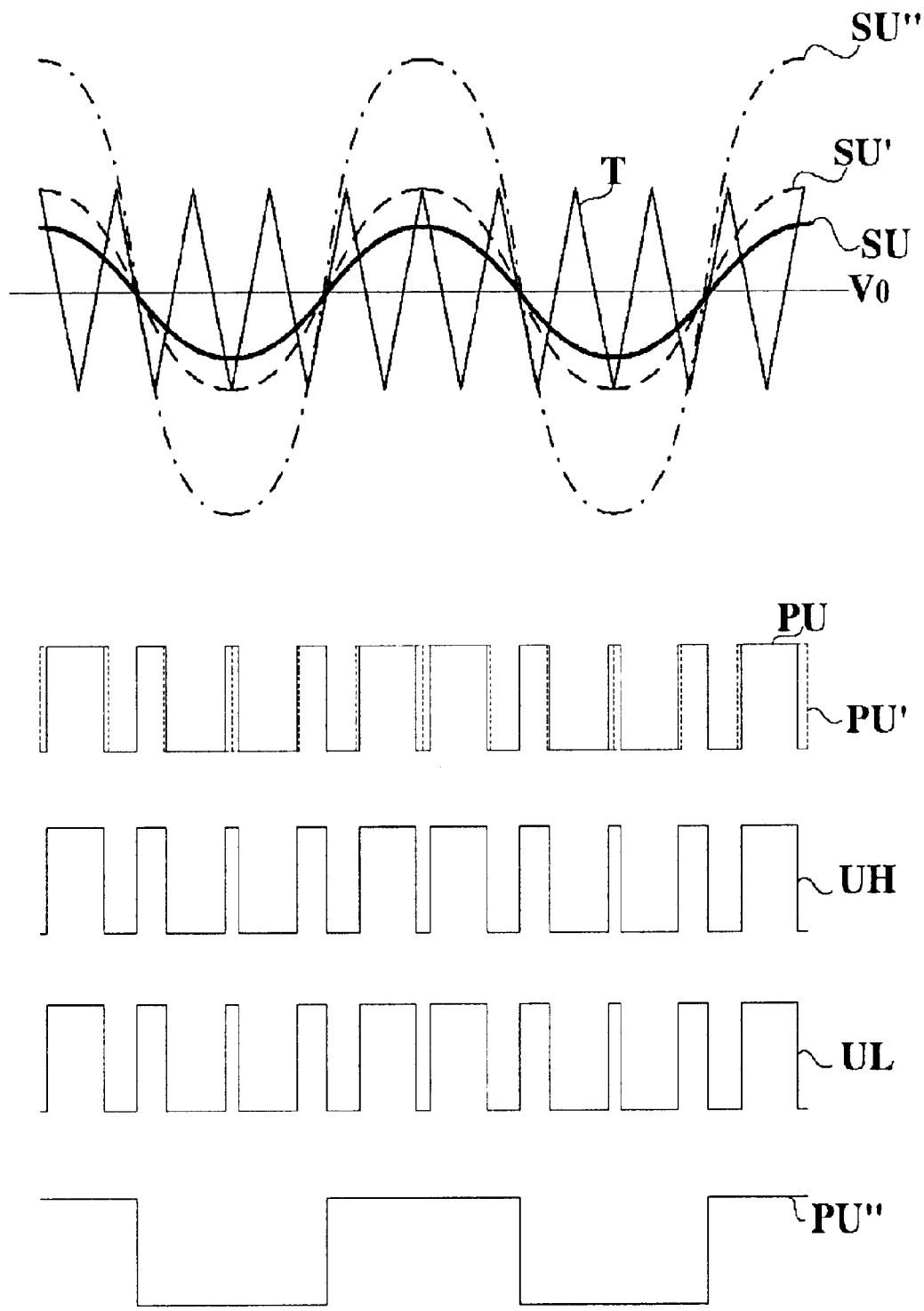
FIG. 1(b) is a waveform timing chart showing operations of a conventional brushless motor drive device.
Figure 2A:
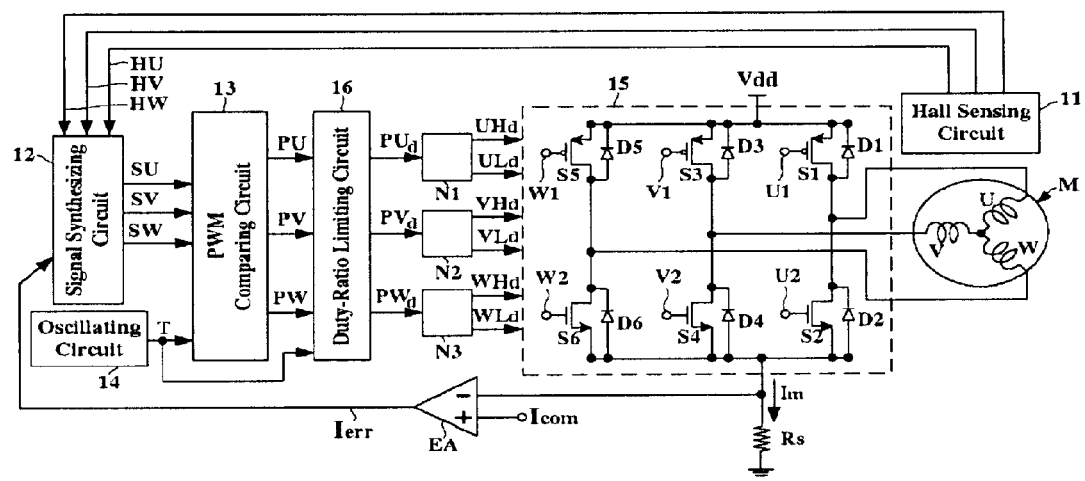
FIG. 2(a) is a circuit block diagram showing a brushless motor drive device according to the present invention.

FIG. 2(a) is a circuit block diagram showing a brushless motor drive device according to the present invention. Referring to FIG. 2(a), a motor M is a three-phase DC brushless motor having three phase coils U, V, and W. A Hall sensing circuit 11 may include three Hall sensors and three Hall amplifiers for the three phase coils U, V, and W, respectively. The Hall sensing circuit 11 is arranged around the motor M for generating three positional detection signals HU, HV, and HW representative of the positional relationships between a rotor of the motor M and the three phase coils U, V, and W, respectively. Each of the positional detection signals HU, HV, and HW is a sinusoidal signal synchronous with the rotation of the motor M and is 120 degrees out of phase with respect to each other. In response to the positional detection signals HU, HV, and HW, a signal synthesizing circuit 12 generates three drive signals SU, SV, and SW.

In one embodiment of the present invention, the drive signals SU, SV, and SW may be implemented by shifting 30 degrees the phases of the corresponding positional detection signals HU, HV, and HW, and therefore the waveforms of the drive signals SU, SV, and SW still remain sinusoidal. In another embodiment of the present invention, the drive signals SU, SV, and SW may be implemented by superposing an appropriate correction signal for compensating the turn-on delay onto the corresponding positional detection signals HU, HV, and HW after the 30-degree phase shifting. Consequently, the waveforms of the drive signals SU, SV, and SW become the superposition of the sinusoidal signal and the correction signal. Many kinds of correction signals have already been disclosed in U.S. Pat. No. 5,811,949, which is incorporated herein by reference.

In one embodiment of the present invention, a high-frequency reference signal T may be implemented by a single triangular signal in which an average value of an amplitude of the triangular signal substantially coincides with an average value of an amplitude of each of the drive signals SU, SV, and SW. In another embodiment of the present invention, the high-frequency reference signal T may be implemented by combining an upper triangular signal and a lower triangular signal, both of which have the same frequency. The valley of the upper triangular signal substantially corresponds in time to the peak of the lower triangular signal. The valley of the upper triangular signal substantially coincides with the average value of the amplitude of each of the drive signals SU, SV, and SW. The peak of the lower triangular signal substantially coincides with the average value of the amplitude of each of the drive signals SU, SV, and SW. Such upper and lower triangular signals have already been disclosed in U.S. Pat. No. 3,585,517, which is incorporated herein by reference.

Figure 2B:
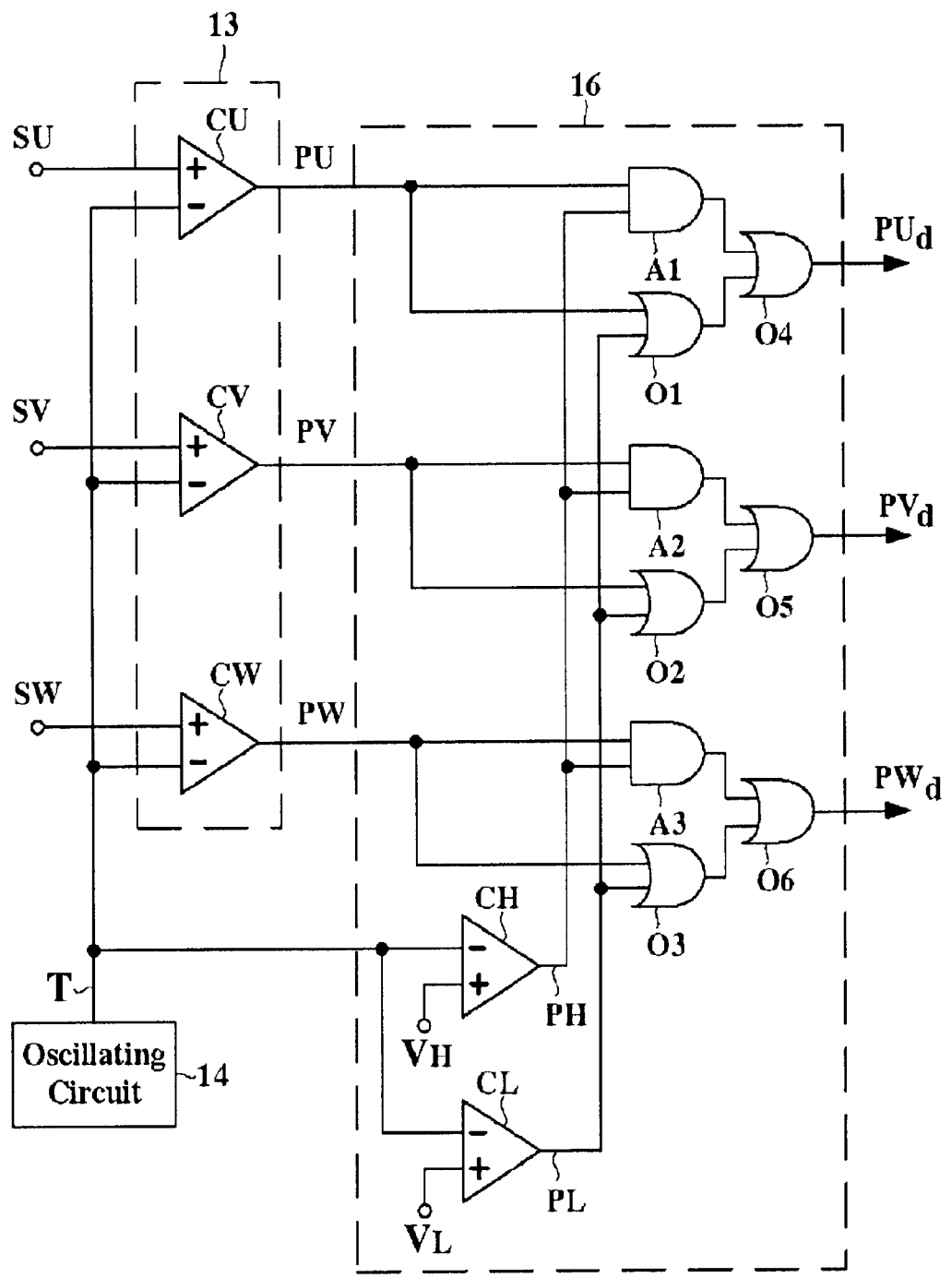
FIG. 2(b) is a detailed circuit diagram showing an example of a duty-ratio limiting circuit according to the present invention.

Referring to FIGS. 2(a) and 2(b), the drive signals SU, SV, and SW are supplied to a PWM comparing circuit 13 for being individually compared with respect to the high-frequency reference signal T generated by an oscillating circuit 14. More specifically, the PWM comparing circuit 13 includes three comparators CU, CV, and CW having non-inverting input terminals for respectively receiving the drive signals SU, SV, and SW and inverting terminals for commonly receiving the high-frequency reference signal T. Based on the comparison of the drive signal SU with the high-frequency reference signal T, the comparator CU generates a pulse signal PU. Based on the comparison of the drive signal SV with the high-frequency reference signal T, the comparator CV generates a pulse signal PV. Based on the comparison of the drive signal SW with the high-frequency reference signal T, the comparator CW generates a pulse signal PW.

The brushless motor drive device according to the present invention is provided with a duty-ratio limiting circuit 16 for limiting the duty ratios of the pulse signals PU, PV, and PW.

A comparator CH is adopted to compare the high-frequency reference signal T with a predetermined positive-half limit level $V_H$ for generating a positive-half duty-ratio limit signal PH. A comparator CL is adopted to compare the high-frequency reference signal T with a predetermined negative-half limit level $V_L$ for generating a negative-half duty-ratio limit signal PL. Subsequently, each of the pulse signals PU, PV, and PW generated by the PWM comparing circuit 13 is constrained by both of the positive-half duty-ratio limit signal PH and the negative-half duty-ratio limit signal PL so as to limit the duty ratio of the complete cycle. On one hand, the positive-half duty-ratio limit signal PH prevents the HIGH levels of the pulse signals PU, PV, and PW each cycle from continuing beyond a maximum HIGH time. On the other hand, the negative-half duty-ratio limit signal PL prevents the LOW levels of the pulse signals PU, PV, and PW each cycle from continuing beyond a maximum LOW time. With the duty-ratio limiting circuit 16, the brushless motor drive device according to the present invention effectively limits the duty ratio of the pulse signals PU, PV, and PW as well as the frequency even when the difference between the motor drive current Im and the current command signal Icom becomes too large. Therefore, a reliable rotation of the motor M is obtained.

More specifically, an AND logic gate A1 is adopted to perform the AND logical operation over the pulse signal PU and the positive-half duty-ratio limit signal PH such that the HIGH time of the pulse signal PU each cycle is constrained within the HIGH time of the positive-half duty-ratio limit signal PH each cycle. An OR logic gate O1 is adopted to perform the OR logical operation over the pulse signal PU and the negative-half duty-ratio limit signal PL such that the LOW time of the pulse signal PU each cycle is constrained within the LOW time of the negative-half duty-ratio limit signal PL each cycle. Finally, an OR logic gate O4 is adopted to combine the output signal of the AND logic gate A1 and the output signal of the OR logic gate O1 for generating a duty-ratio-limited pulse signal $PU_d$. Therefore, the portion of the pulse signal $PU_d$ corresponding to the positive half of the drive signal SU has the duty ratio limited by the positive-half duty-ratio limit signal PH while the portion of the pulse signal $PU_d$ corresponding to the negative half of the drive signal SU has the duty ratio effectively limited by the negative-half duty-ratio limit signal PL.

An AND logic gate A2 is adopted to perform the AND logical operation over the pulse signal PV and the positive-half duty-ratio limit signal PH such that the HIGH time of the pulse signal PV each cycle is constrained within the HIGH time of the positive-half duty-ratio limit signal PH each cycle. An OR logic gate O2 is adopted to perform the OR logical operation over the pulse signal PV and the negative-half duty-ratio limit signal PL such that the LOW time of the pulse signal PV each cycle is constrained within the LOW time of the negative-half duty-ratio limit signal PL each cycle. Finally, an OR logic gate O5 is adopted to combine the output signal of the AND logic gate A2 and the output signal of the OR logic gate O2 for generating a duty-ratio-limited pulse signal $PV_d$. Therefore, the portion of the pulse signal $PV_d$ corresponding to the positive half of the drive signal SV has the duty ratio effectively limited by the positive-half duty-ratio limit signal PH while the portion of the pulse signal $PV_d$ corresponding to the negative half of the drive signal SV has the duty ratio effectively limited by the negative-half duty-ratio limit signal PL.

An AND logic gate A3 is adopted to perform the AND logical operation over the pulse signal PW and the positive-half duty-ratio limit signal PH such that the HIGH time of the pulse signal PW each cycle is constrained within the HIGH time of the positive-half duty-ratio limit signal PH each cycle. An OR logic gate O3 is adopted to perform the OR logical operation over the pulse signal PW and the negative-half duty-ratio limit signal PL such that the LOW time of the pulse signal PW each cycle is constrained within the LOW time of the negative-half duty-ratio limit signal PL each cycle. Finally, an OR logic gate O6 is adopted to combine the output signal of the AND logic gate A3 and the output signal of the OR logic gate O3 for generating a duty-ratio-limited pulse signal $PW_d$. Therefore, the portion of the pulse signal $PW_d$ corresponding to the positive half of the drive signal SW has the duty ratio effectively limited by the positive-half duty-ratio limit signal PH while the portion of the pulse signal $PW_d$ corresponding to the negative half of the drive signal SW has the duty ratio effectively limited by the negative-half duty-ratio limit signal PL.

Referring back to FIG. 2(a), the duty-ratio-limited pulse signals $PU_d$, $PV_d$, and $PW_d$ are supplied to three pre-driving circuits N1, N2, and N3, respectively. In response to the pulse signal $PU_d$, the pre-driving circuit N1 generates a pair of switching signals $UH_d$ and $UL_d$. In response to the pulse signal $PV_d$, the pre-driving circuit N2 generates a pair of switching signals $VH_d$ and $VL_d$. In response to the pulse signal $PW_d$, the pre-driving circuit N3 generates a pair of switching signals $WH_d$ and $WL_d$. The pre-driving circuits N1, N2, and N3 not only enhances the driving ability but also creates the non-overlapping characteristic for the waveforms of each pair of the switching signals $UH_d$ and $UL_d$, $VH_d$ and $VL_d$, and $WH_d$ and $WL_d$.

A three-phase switching circuit 15 has a pair of switches S1 and S2, a pair of switches S3 and S4, and a pair of switches S5 and S6, each pair being controlled by the switching signals $UH_d$ and $UL_d$, $VH_d$ and $VL_d$, and $WH_d$ and $WL_d$, respectively. More specifically, the switch S1 is coupled between a drive voltage source Vdd and the coil U while the switch S2 is coupled between the coil U and a ground potential. The switching signal $UH_d$ is supplied to a terminal U1 for controlling the switch S1 while the switching signal $UL_d$ is supplied to a terminal U2 for controlling the switch S2. Therefore, a motor drive current Im is allowed to flow from the drive voltage source Vdd to the coil U when the switch S1 is turned ON and is allowed to flow from the coil U to the ground potential when the switch S2 is turned ON. The switch S3 is coupled between the drive voltage source Vdd and the coil V while the switch S4 is coupled between the coil V and the ground potential. The switching signal $VH_d$ is supplied to a terminal V1 for controlling the switch S3 while the switching signal $VL_d$ is supplied to a terminal V2 for controlling the switch S4. Therefore, the motor drive current Im is allowed to flow from the drive voltage source Vdd to the coil V when the switch S3 is turned ON and is allowed to flow from the coil V to the ground potential when the switch S4 is turned ON. The switch S5 is coupled between the drive voltage source Vdd and the coil W while the switch S6 is coupled between the coil W and the ground potential. The switching signal $WH_d$ is supplied to a terminal W1 for controlling the switch S5 while the switching signal $WL_d$ is supplied to a terminal W2 for controlling the switch S6. Therefore, the motor drive current Im is allowed to flow from the drive voltage source Vdd to the coil W when the switch S5 is turned ON and is allowed to flow from the coil W to the ground potential when the switch S6 is turned ON.

In one embodiment of the present invention, each of the switches S1, S3, and S5 is implemented by a PMOS transistor while each of the switches S2, S4, and S6 is implemented by an NMOS transistor. In another embodiment of the present invention, each of the switches S1 to S6 is implemented by a NMOS transistor.

In one embodiment of the present invention, each pair of the switches S1 and S2, S3 and S4, and S5 and S6 is modulated in a hard chopping manner by the corresponding pair of the switching signals $UH_d$ and $UL_d$, $VH_d$ and $VL_d$, and $WH_d$ and $WL_d$. The hard chopping modulation is referred to as that the upper-side switch S1, S3, or S5 is turned ON/OFF when the lower-side switch S2, S4, or S6 is synchronously, but oppositely, turned OFF/ON. In another embodiment of the present invention, each pair of the switches S1 and S2, S3 and S4, and S5 and S6 is modulated in a soft chopping manner by the corresponding pair of the switching signals $UH_d$ and $UL_d$, $VH_d$ and $VL_d$, and $WH_d$ and $WL_d$. The soft chopping modulation is referred to as that the upper-side switch S1, S3, or S5 is turned ON/OFF and the lower-side switch S2, S4, or S6 keeps OFF during the positive half of the drive signals SU, SV, and SW, and the lower-side switch S2, S4, or S6 is turned ON/OFF and the upper-side switch S1, S3, or S5 keeps OFF during the negative half of the drive signals SU, SV, and SW. The hard and soft chopping modulations have already been disclosed in U.S. Pat. No. 6,710,572, which is incorporated herein by reference.

Figure 2C:
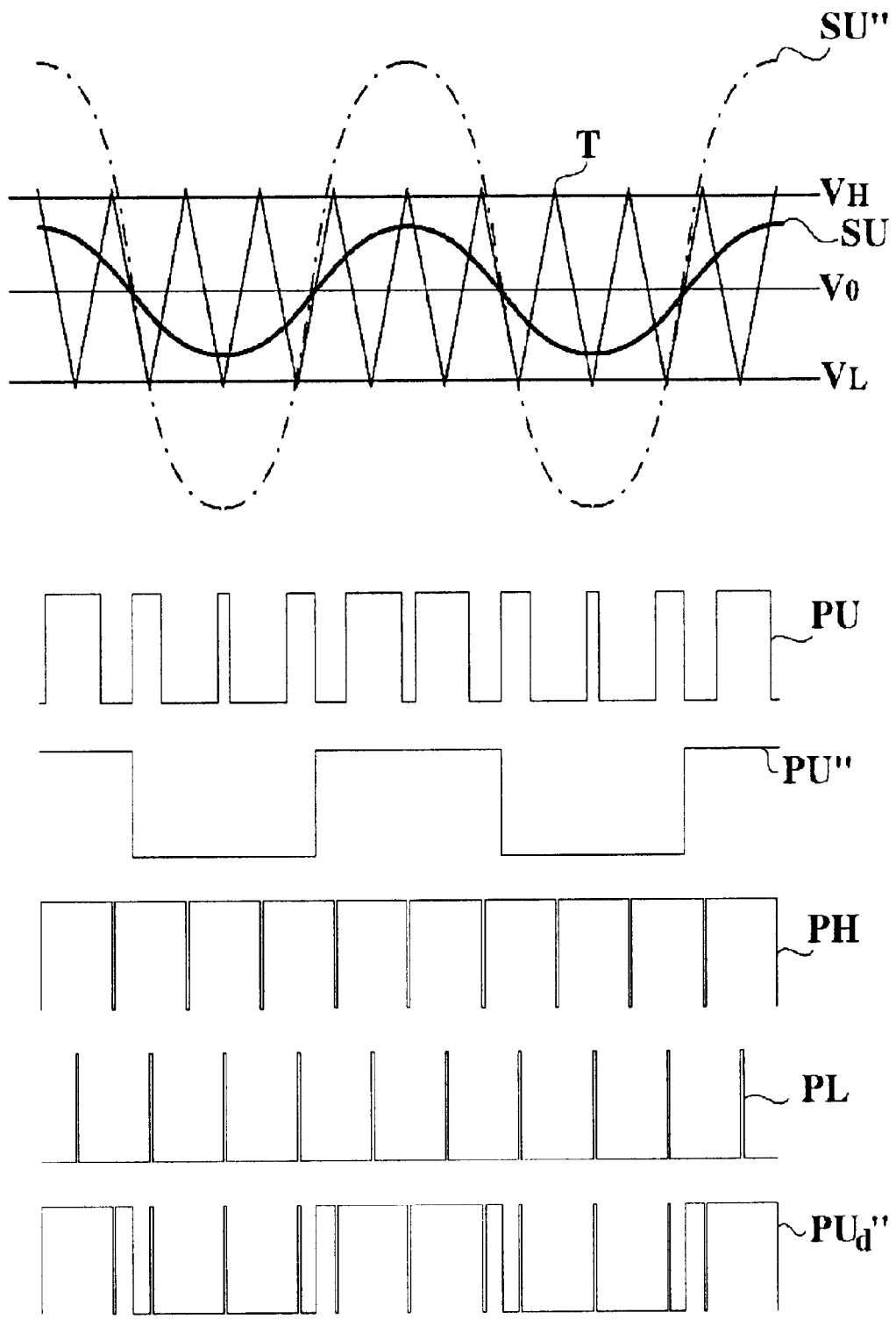
FIG. 2(c) is a waveform timing chart showing operations of a brushless motor drive device according to the present invention.

FIG. 2(c) is a waveform timing chart showing operations of the brushless motor drive device according to the present invention. For the sake of simplicity, only is illustrated in FIG. 2(c) the operational waveforms associated with the coil U of the motor M since each of the phase coils U, V, and W of the motor M is operated with similar waveforms. Referring to FIG. 2(c), the positive-half limit level $V_H$ is set substantially equal to the peak of the high-frequency reference signal T and, preferably, slightly smaller than the peak. Based on the comparison of the positive-half limit level $V_H$ and the high-frequency reference signal T, the comparator CH shown in FIG. 2(b) generates the positive-half duty-ratio limit signal PH, as described above. The negative-half limit level $V_L$ is set substantially equal to the valley of the high-frequency reference signal T and, preferably, slightly larger than the valley. Based on the comparison of the negative-half limit level $V_L$ and the high-frequency reference signal T, the comparator CL shown in FIG. 2(b) generates the negative-half duty-ratio limit signal PL, as described above.

When the amplitude of the drive signal SU is smaller than that of the high-frequency reference signal T, the duty-ratio limiting circuit 16 operates without any practical effects, i.e., the duty-ratio-limited pulse signal $PU_d$ is identical to the original pulse signal PU. However, when the amplitude of the drive signal SU in response to the feedback of the current error signal Ierr is adjusted to become a drive signal SU" having an amplitude larger than that of the high-frequency reference signal T, the PWM comparing circuit 13 generates a low-frequency pulse signal PU" which continues at the HIGH/LOW level for a relatively long time. The continuous HIGH time of the low-frequency pulse signal PU" each cycle is constrained within the HIGH time of the positive-half duty-ratio limit signal PH each cycle, for example, through the AND logic gate A1 shown in FIG. 2(b). Similarly, the continuous LOW time of the low-frequency pulse signal PU" each cycle is constrained within the LOW time of the negative-half duty-ratio limit signal PL each cycle, for example, through the OR logic gate O1 shown in FIG. 2(b). As a result, the low-frequency pulse signal PU" is transformed into the duty-ratio-limited pulse signal $PU_d$" having the same frequency as the high-frequency reference signal T and an appropriate duty ratio for ensuring the reliable rotation of the motor M.

While the invention has been described by way of examples and in terms of preferred embodiments, it is to be understood that the invention is not limited to the disclosed embodiments. To the contrary, it is intended to cover various modifications. Therefore, the scope of the appended claims should be accorder the broadest interpretation so as to encompass all such modifications.

What is claimed is:

1. A brushless motor drive device comprising:
    a comparing circuit for comparing a drive signal and a reference signal to generate a pulse signal, the drive signal being associated with a rotation of a brushless motor and a frequency of the reference signal being higher than a frequency of the drive signal;
    a switching circuit coupled between a drive voltage source and the brushless motor and controlled by the pulse signal for driving the brushless motor;
    means for adjusting a relative relationship between an amplitude of the drive signal and an amplitude of the reference signal in accordance with a current error signal representative of a difference between a current command signal and a motor drive current; and
    a limiting circuit for limiting a duty ratio of the pulse signal.

2. The device according to claim 1, wherein:
    the drive signal is a sinusoidal signal.

3. The device according to claim 2, wherein:
    the drive signal is superposed with a correction signal for compensating a turn-on delay.

4. The device according to claim 1, wherein:
    the reference signal is a triangular signal, in which an average value of an amplitude of the triangular signal substantially coincides with an average value of the amplitude of the drive signal.

5. The device according to claim 1, wherein:
    the reference signal is formed by an upper triangular signal and a lower triangular signal, in which a valley of the upper triangular signal substantially corresponds in time to a peak of the lower triangular signal, and substantially coincides with an average value of the amplitude of the drive signal.

6. The device according to claim 1, further comprising:
    a Hall sensing circuit for generating a positional detection signal representative of a positional relationship between a rotor and a coil of the brushless motor, and
    a synthesizing circuit for generating the drive signal in response to the positional detection signal.

7. The device according to claim 6, wherein:
    the current error signal is supplied to the Hall sensing circuit for adjusting an amplitude of the positional detection signal.

8. The device according to claim 6, wherein:
    the current error signal is supplied to the synthesizing circuit for adjusting the amplitude of the drive signal.

9. The device according to claim 1, wherein:
    the switching circuit comprises:
    an upper-side switch coupled between the drive voltage source and the brushless motor, and
    a lower-side switch coupled between the brushless motor and a ground potential, in which:
    when the upper-side switch is turned ON/OFF in accordance with the pulse signal, the lower-side switch is synchronously turned OFF/ON in accordance with the pulse signal.

10. The device according to claim 1, wherein:

the switching circuit comprises:

an upper-side switch coupled between the drive voltage source and the brushless motor, and a lower-side switch coupled between the brushless motor and a ground potential, in which:

when the upper-side switch is turned ON/OFF in accordance with the pulse signal, the lower-side switch keeps OFF, and when the lower-side switch is turned ON/OFF in accordance with the pulse signal, the upper-side switch keeps OFF.

11. The device according to claim 1, wherein:

the limiting circuit comprises:

means for generating a positive-half duty-ratio limit signal, and means for generating a negative-half duty-ratio limit signal.

12. The device according to claim 11, wherein:

the limiting circuit further comprises:

means for preventing a HIGH time of the pulse signal each cycle from continuing longer than a HIGH time of the positive-half duty-ratio limit signal each cycle, and means for preventing a LOW time of the pulse signal each cycle from continuing longer than a LOW time of the negative-half duty-ratio limit signal each cycle.

13. The device according to claim 1, wherein:

the current error signal is supplied to adjust the amplitude of the drive signal.

14. The device according to claim 1, wherein:

the current error signal is supplied to adjust the amplitude of the reference signal.

15. A brushless motor drive device comprising:

a comparing circuit for comparing a drive signal and a reference signal to generate a pulse signal, the drive signal being associated with a rotation of a brushless motor and a frequency of the reference signal being higher than a frequency of the drive signal;

a switching circuit coupled between a drive voltage source and the brushless motor and controlled by the pulse signal for driving the brushless motor;

means for adjusting a relative relationship between an amplitude of the drive signal and an amplitude of the reference signal in accordance with a current error signal representative of a difference between a current command signal and a motor drive current; and a limiting circuit for preventing a frequency of the pulse signal from being lower than the frequency of the reference signal.

16. The device according to claim 15, wherein:

the limiting circuit comprises:

means for generating a positive-half limit signal, and means for generating a negative-half limit signal.

17. The device according to claim 16, wherein:

the limiting circuit further comprises:

means for preventing a HIGH time of the pulse signal each cycle from continuing longer than a HIGH time of the positive-half duty-ratio limit signal each cycle, and means for preventing a LOW time of the pulse signal each cycle from continuing longer than a LOW time of the negative-half duty-ratio limit signal each cycle.

18. The device according to claim 15, further comprising:

a Hall sensing circuit for generating a positional detection signal representative of a positional relationship between a rotor and a coil of the brushless motor, and a synthesizing circuit for generating the drive signal in response to the positional detection signal.

19. The device according to claim 18, wherein:

the current error signal is supplied to the Hall sensing circuit for adjusting an amplitude of the positional detection signal.

20. The device according to claim 18, wherein:

the current error signal is supplied to the synthesizing circuit for adjusting the amplitude of the drive signal.

* * * * *